No. 866,874.  
PATENTED SEPT. 24, 1907.  
J. E. MACKAY.  
TIRE.  
APPLICATION FILED JAN. 23, 19
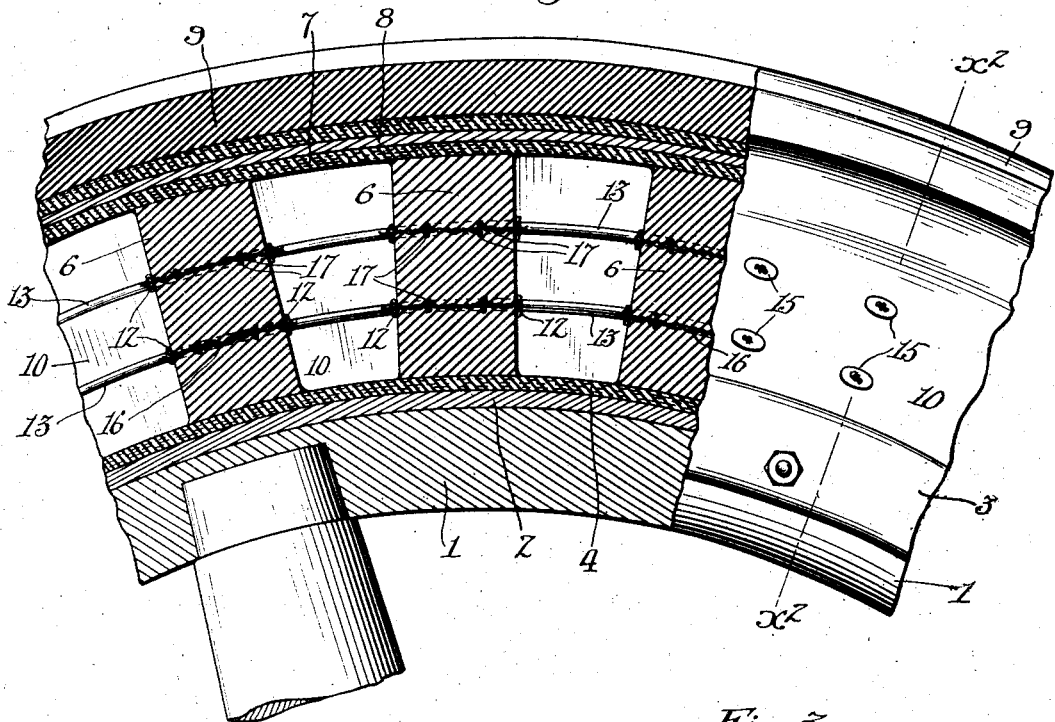
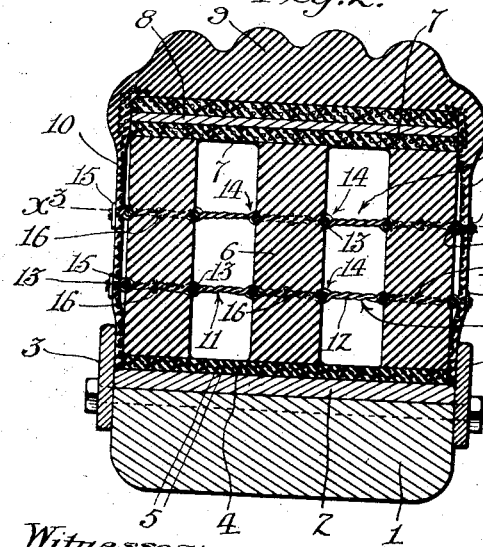
Witnesses:—  
Frank L. A. Graham  
Inventor;  
Joseph E. MacKay.

UNITED STATES PATENT OFFICE.

JOSEPH E. MacKAY, OF LOS ANGELES, CALIFORNIA.

TIRE.

No. 866,874.

Specification of Letters Patent.

Patented Sept. 24, 1907.

Application filed January 23, 1907. Serial No. 353,745.

*To all whom it may concern:*

Be it known that I, JOSEPH E. MACKAY, a citizen of the United States, residing at Los Angeles, in the county of Los Angeles and State of California, have invented a new and useful Tire, of which the following is a specification.

This invention relates to tires and particularly to spring tires, and the main objects of the invention are to produce a spring tire which is of simple and economical construction, which is extremely durable in use and which will contain the desired amount of resiliency.

The accompanying drawings illustrate the invention, and referring thereto:—Figure 1 is a side view of a portion of the tire, partly in section. Fig. 2 is a section on line $x^2-x^2$, Fig. 1. Fig. 3 is a section on line $x^3-x^3$, Fig. 2.

In its preferred form the tire comprises a plurality of concentric rings formed of woven wire, a plurality of rows of elastic blocks engaging in the meshes in the woven wire rings, a band of fabric interwoven with wires encircling the blocks, a metallic band around said fabric, a rubber tread around said band, a fabric band around the ends of said blocks, and curtains of fabric on each side extending from the rubber tread to the inner band of fabric.

1 designates the wheel rim having a metal band 2, and detachable side retaining rings 3 which are employed for holding the tire in place. That part of the tire which rests on the metal band 2 preferably comprises a band of fabric 4, having interwoven wires or strands 5 which extend in a direction generally parallel with the band of fabric 4. Extending radially from the fabric 4 is a plurality of elastic blocks 6 formed preferably of rubber. While I have shown the elastic blocks 6 as arranged in three rows, it is obvious that more or less rows could be employed as desired, and that the dimensions of these elastic blocks could be varied as desired. Encircling the elastic blocks 6 is another band of fabric 7 similar to the band 4 and around the band 7 is a metallic band 8. Outside of the metallic band 8 is a tread 9 formed of rubber or other yielding material, the tread portion of which may be corrugated as shown, or formed in any other desired manner.

Curtains 10 on each side of the tire are formed preferably of fabric with interwoven threads or wires, and extend from both edges of the tread 9 down to the band 4. The curtains 10 serve to confine and house the inner portions of the tire and may be joined to the tread 9 and band 4 in any desired manner.

Two concentric rings 11 formed of woven wire extend around the tire, and the elastic blocks 6, as clearly shown, pass through meshes in the woven wire rings 11 and thus the blocks 6 are positively held in position and yet are free to be compressed as only a very slight portion of the surface of each block is confined by the woven wire.

Each woven wire ring is constructed preferably of lateral wires 12 twisted together and which interlock with circular wires 13, which latter pass around the tire, the wires 13 having abrupt kinks 14 at the junction with wires 12, the wires 12 being slightly separated at the junction to receive the kinks 14, as clearly shown in Figs. 2 and 3. The outer ends of the twisted wires 12 pass through the curtains 10 and through small washers 15 which bear against the outside of the curtains 10, each washer 15 being provided with two perforations through which the wires 12 pass, the extreme outer ends of wires 12 being twisted or tied outside of the washers 15.

Each elastic block 6 is provided with small twisted wires 16 and 17 which pass at right angles to each other clear through the block, the outer ends of wires 16 being tied around the twisted wires 12, while the outer ends of twisted wires 17 are tied around the wires 13. These wires 16 and 17 are molded in the blocks 6.

It will be seen that the parts of the tire are all securely locked in the proper relation and that in operation the elastic blocks 6 are permitted to freely yield when they sustain the load. The curtains 10 house and completely protect the tire and prevent the entrance of mud or dust into the interstices of the tire, which otherwise would destroy the resiliency by restricting the free compressibility of the elastic blocks.

What I claim is:—

1. A tire comprising a circular woven wire element, a series of elastic blocks engaging in the meshes of the woven wire element, and a tread encircling the blocks.

2. A tire comprising a circular woven wire element, a plurality of circular rows of elastic blocks retained by the meshes of the woven wire element, and a tread encircling the blocks.

3. A tire comprising a plurality of concentric woven wire rings, a series of elastic blocks retained by the woven wire rings, and a tread encircling the blocks.

4. A tire comprising a plurality of concentric woven wire rings, a plurality of rows of elastic blocks engaging in meshes in the woven wire rings, and a tread encircling the blocks.

5. A tire comprising a circular woven wire element, a series of elastic blocks engaging in meshes in the woven wire element, a band of fabric encircling the blocks, a band of metal around said fabric, and a yielding tread around said metal band.

6. A tire comprising a circular woven wire element, a series of elastic blocks engaging in meshes in the woven wire element, a band of fabric encircling the blocks, a band of metal around said fabric, a yielding tread around said metal band, and a band of fabric around the inner ends of said blocks.

7. A tire comprising a circular woven wire element, a series of elastic blocks engaging in meshes in the woven wire element, a band of fabric encircling the blocks, a band of metal around said fabric, a yielding tread around said metal band, a band of fabric around the inner ends of said blocks, and curtains of fabric on each side of the tire extending from the tread to the inner fabric.

8. A tire comprising a plurality of concentric woven wire rings, a plurality of rows of elastic blocks engaging in meshes in the rings, a band of fabric interwoven with wires encircling the blocks, a metallic band around said fabric, a rubber tread around said metal band, a fabric band around the inner ends of said blocks, and curtains of fabric on each side extending from the rubber tread to the inner band of fabric.

9. A tire comprising a circular woven wire element, a series of elastic blocks engaging in the meshes in the woven wire element, a tread encircling the blocks, and small wires extending through the blocks and tied to the woven wire element.

10. A tire comprising a circular woven wire element, a series of elastic blocks engaging in the meshes in the woven wire element, a tread encircling the blocks, small wires extending through the blocks and tied to the woven wire element, said woven wire element comprising twisted cross wires, and circular wires interlocking with the cross wires.

11. A tire comprising a circular woven wire element, a series of elastic blocks engaging in the meshes in the woven wire element, a tread encircling the blocks, small wires extending through the blocks and tied to the woven wire element, said woven wire element comprising twisted cross wires, circular wires having kinks which interlock with the twisted wires, said small wires being tied to the twisted cross wires and circular wires.

12. A tire comprising a plurality of concentric woven wire rings, a plurality of rows of elastic blocks engaging in meshes in the woven wire rings, a band of fabric interwoven with wires encircling the blocks, a metallic band around said fabric, a rubber tread around said metal band, a fabric band around the inner ends of said blocks, curtains of fabric on each side extending from the rubber tread to the inner band of fabric, each woven wire ring comprising circular wires with kinks, twisted cross wires interlocking with the kinks, small twisted wires extending through the elastic blocks and having their ends tied to the circular wires and twisted cross wires, the ends of said cross wires extending through said curtains, and tied, there being a washer between each tie and the curtain.

In testimony whereof, I have hereunto set my hand at Los Angeles, California, this 7th day of January, 1907.

JOSEPH E. MacKAY.

In presence of—
GEORGE T. HACKLEY,
FRANK L. A. GRAHAM.